(12) United States Patent
Kaiwar (10) Patent No.: US 9,286,054 B2
(45) Date of Patent: Mar. 15, 2016

(54) DEPLOYMENT OF MOBILE ENTERPRISE APPLICATION PLATFORM

(71) Applicant: Diwakar Kaiwar, Bangalore (IN)

(72) Inventor: Diwakar Kaiwar, Bangalore (IN)

(73) Assignee: Pravaa Infosystems Private Limited, Bangalore (IN)

( * ) Notice: Subject to any disclaimer, the term of this patent is extended or adjusted under 35 U.S.C. 154(b) by 255 days.

(21) Appl. No.: 13/894,671

(22) Filed: May 15, 2013

(65) Prior Publication Data

US 2013/0311984 A1 Nov. 21, 2013

(30) Foreign Application Priority Data

May 15, 2012 (IN) ............................ 1944/CHE/2012

(51) Int. Cl.
*G06F 9/445* (2006.01)
*G06F 9/44* (2006.01)

(52) U.S. Cl.
CPC ................ *G06F 8/65* (2013.01); *G06F 9/4443* (2013.01)

(58) Field of Classification Search
None
See application file for complete search history.

(56) References Cited

U.S. PATENT DOCUMENTS

| | | | | |
|---|---|---|---|---|
| 8,612,933 B1* | 12/2013 | Gill | ............................ | G06F 8/30 717/105 |
| 2004/0224674 A1* | 11/2004 | O'Farrell et al. | . | G06F 17/30575 455/418 |
| 2007/0033588 A1* | 2/2007 | Landsman | ........ | G06F 17/30899 717/178 |
| 2007/0067373 A1* | 3/2007 | Higgins | ............... | G06F 11/3013 |
| 2008/0016187 A1* | 1/2008 | Neil et al. | ...................... | 709/220 |
| 2010/0142406 A1* | 6/2010 | Goring | .................... | G06F 9/546 370/254 |
| 2010/0251230 A1* | 9/2010 | O'Farrell et al. | ............. | 717/173 |
| 2010/0262958 A1* | 10/2010 | Clinton et al. | ................. | 717/171 |
| 2010/0281475 A1* | 11/2010 | Jain et al. | ....................... | 717/172 |
| 2011/0119663 A1* | 5/2011 | Liu | ............................... | 717/170 |
| 2011/0307880 A1* | 12/2011 | Hilerio | .................... | H04L 67/02 717/171 |
| 2013/0104114 A1* | 4/2013 | Reiss et al. | ..................... | 717/170 |
| 2013/0212559 A1* | 8/2013 | Lehtimaki | ................. | G06F 8/38 717/109 |

OTHER PUBLICATIONS

Fjellheim, F. Over-the-air Deployment of Applications in Multi-Platform Environments. Software Engineering Conference, 2006. Australian. Retrieved on [Dec. 21, 2015] Retrieved from the Internet: URL<http://ieeexplore.ieee.org/stamp/stamp.jsp?tp=&arnumber=1615049>.*

Nichols et al. Highlight: A System for Creating and Deploying Mobile Web Applications. Proceedings of the 21st annual ACM symposium on User interface software and technology. ACM, 2008. Retrieved on [Dec. 21, 2015] Retrieved from the Internet: URL<http://dl.acm.org/citation.cfm?id=1449757>.*

* cited by examiner

*Primary Examiner* — Thuy Dao
*Assistant Examiner* — Cheneca Smith
(74) *Attorney, Agent, or Firm* — Rahman LLC (57) ABSTRACT

The embodiments herein relate to a method and system for design and deployment of cross platform native mobile enterprise applications. Multiple versions of the same application need not be installed repeatedly instead the existing version can be updated. Mobile Applications User Interface and Business Logic are recognized by a smart mobile client (specific for each operating system), which allows changes to User interface and business logic to be pushed from the application management server to the client without need for re-installation. Information between Mobile Server and smart client is exchanged using a proprietary message structure, which has been developed to build complex mobile application. A smart interpreter interprets and parses the application while also rendering it at run time. The smart mobile client has pre-built ability to use native mobile device features and support for offline storage and synchronization with the mobile server.

11 Claims, 4 Drawing Sheets

DEPLOYMENT OF MOBILE ENTERPRISE APPLICATION PLATFORM

TECHNICAL FIELD

The embodiments herein relate to Mobile computing and, more particularly, to design and development of mobile applications in Mobile computing.

BACKGROUND

Mobile Computing enables users to connect to the internet, providing wireless transmission to access data and information from where ever location they may be. Mobile computing broadly comprises of three areas: mobile communication, mobile hardware, and mobile software. The first area addresses communication issues in ad-hoc and infrastructure networks as well as communication properties, protocols, data formats and concrete technologies. The second area is on the hardware, e.g., mobile devices or device components. The third area deals with the characteristics and requirements of mobile applications.

Mobile application development is the process by which application software is developed for mobile devices such as personal digital assistants, enterprise digital assistants, mobile phones, tablets and so on. These applications are either pre-installed on mobile devices during manufacture, downloaded by users from various mobile software distribution platforms, or web applications delivered over HTTP which use server-side or client-side processing (e.g. JavaScript) to provide an "application-like" experience within a Web browser.

In the recent past, the development of mobile services was mostly controlled and managed by the mobile network operators (MNO), phone manufacturers, mobile application and content providers. Recently, this has changed with the arrival of new mobile devices and platforms. Development of mobile applications has generated more interest among the independent and freelance developers. The constant improvement of hardware related to mobile computing (e.g., better computing power, larger wireless network bandwidth) clearly enhances capabilities of mobile devices. The potential of the mobile application market is seen to reach $9 billion by 2011.

Mobile Application Management (MAM) describes software and services that accelerate and simplify the creation of internally-developed or "in-house" enterprise mobile applications. It also describes the deployment and management of in-house and commercially available mobile apps used in business settings on both company-provided and "bring your own" devices.

In spite of the continuous development, mobile applications still seem to have some disadvantages such as re-installing mobile applications on the mobile device each time an application is changed or when new applications are added. Further, some applications are capable of working in only online mode and are unable to run natively on the mobile device and disallows usage of the mobile device's functionalities in offline mode.

In an existing method of mobile application development, enterprise data is accessed from one or more data sources, wherein such data sources may comprise structured and unstructured data sources. The data is transferred from the enterprise to a plurality of mobile devices over a plurality of diverse networks. In an embodiment, such transfer takes into consideration characteristics of the diverse networks which are present in the path between the enterprise and the mobile device. The enterprise receives data generated by mobile devices while performing enterprise-related operations at the wireless edge. The enterprise responds to environmental changes using the received data. Limitations of the above existing method are that the user interface cannot be delivered to the client without deployment of application logic and is unable to adapt the mobile user interface for different architectures.

In another existing method for mobile computing, a single integrated Development Environment (IDE) for mobile devices is present. A flexible runtime architecture is provided that enables developers to construct user-interface using runtime technology that suits their needs. Using the Programming Interface (PI) mechanism, application servers can publish information about their program version or server load. In a manner transparent for the users, the mobile device can then update its UI description if an application's PI indicates that a new version has been deployed. Or, if multiple instances of the same application are available keep the bandwidth requirements low. The disadvantages of this method are that it requires an installation upgrade at the mobile device side, once the application is upgraded with user intervention. This takes time, effort and costs from both the application provider and the user end.

In another existing method for mobile computing, products services can be efficiently delivered to a large number of clients, using mobile Internet access technologies. The users using their mobile devices can have access to e-services, anywhere and anytime, with the support of 3G, GPRS, WLAN, etc., channels bandwidth, data services and protocols. Based on the mobile communications networks evolution and development, a convergence of technological and financial interest's mobile operators, software developers, mobile terminals producers and e-content providers is established. These will lead to a high level integration of IT&C resources and will facilitate the value added services delivery through the mobile communications networks. The disadvantages of this method are that the application is unable to exploit full device capabilities (say, camera, Bluetooth and so on), cannot leverage device level security, requires high data bandwidth and typically requires a continuous data connection to function effectively.

SUMMARY

The embodiments herein relate to a method and system for design and deployment of mobile enterprise applications. Multiple versions of the same application need not be installed repeatedly instead the existing version can be updated. Mobile Applications User Interface and Business Logic are recognized by a smart mobile client (specific for each operating system), which allows changes to User interface and business logic to be pushed from the application management server to the client without need for re-installation. Information between Mobile Server and smart client is exchanged using a proprietary message structure, which has been developed to build complex mobile application. A smart interpreter interprets and parses the application while also rendering it at run time. The design allows segregating UI specific elements from Data elements thus reducing data exchange between the mobile client and the mobile server significantly.

These and other aspects of the embodiments herein will be better appreciated and understood when considered in conjunction with the following description and the accompanying drawings.

BRIEF DESCRIPTION OF THE FIGURES

The embodiments herein will be better understood from the following detailed description with reference to the drawings, in which.

DETAILED DESCRIPTION OF EMBODIMENTS

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein disclose a method for design and deployment of mobile enterprise application platform by using a Meta data driven architecture and a defined message structure. Referring now to the drawings, and more particularly to FIGS. 1 through 4, where similar reference characters denote corresponding features consistently throughout the figures, there are shown embodiments.

Figure 1:
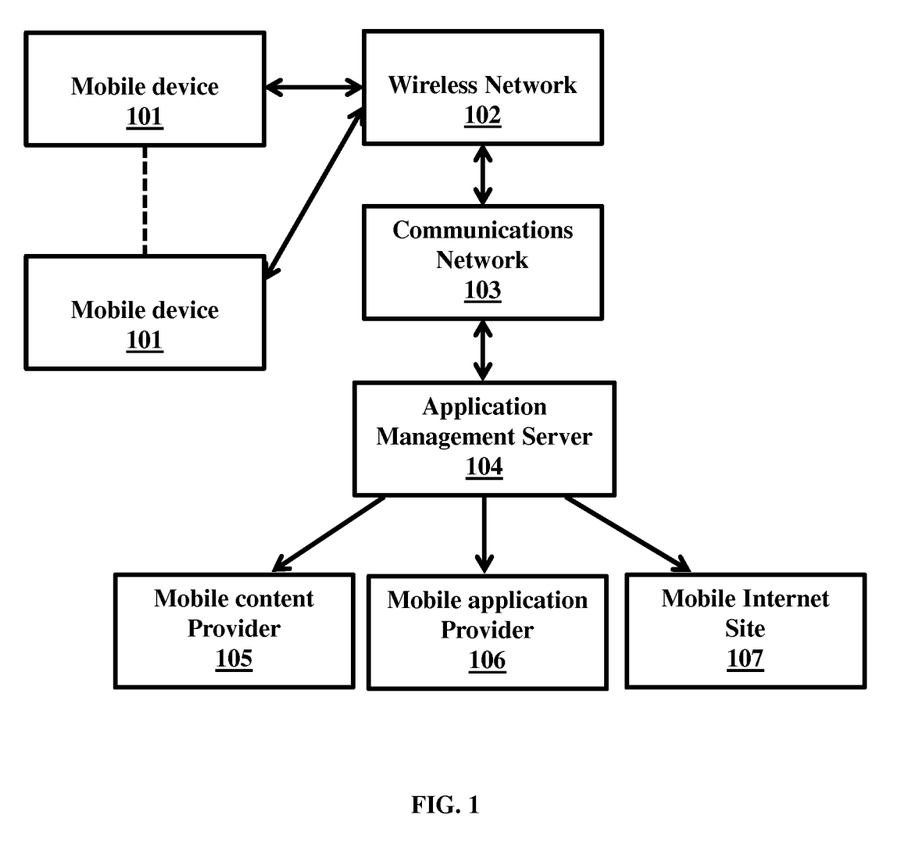
FIG. 1 is a block diagram which depicts the various components of an exemplary mobile computing platform system as disclosed in the embodiments herein.

FIG. 1 illustrates a block diagram which depicts the various components of an exemplary mobile computing platform system as disclosed in the embodiments herein. The system comprises of a plurality of mobile devices 101, a wireless network 102, a communications network 103, an application management server 104, at least one mobile content provider 105, at least one mobile application provider 106, and at least one mobile internet site 107. The mobile device 101 may be a portable mobile computing device capable of connecting to another mobile computing device/communication network and accessing information. The mobile device 101 transmits information to and receives information from the application management server 104, via the wireless data network 102 and the communications network 103. The mobile device 101 may be in the form of mobile phones, smart phones, personal digital assistants, tablets and the like.

Further, the wireless network 102 is configured to connect the plurality of mobile devices 101 with the communications network 103. The wireless data network 102 may comprise of a variety of networks like mesh networks, Wireless LAN (WLAN) networks and the like. The wireless data network 102 may further employ a plurality of access technologies comprising 2G, 3G generation radio access for cellular systems, WLAN, wireless router (WR) mesh and the like. The communication network 103 is configured to couple the application management server 104 with mobile devices 101 through the wireless network 102.

Further, the mobile content provider 105, the mobile application provider 106 and mobile internet site 107 interact with the application management server 104 to provide a user mobile application, from which users can access and update information including data and media contents.

Initially, user of the mobile device 101 obtains information from the application management server 104, via the wireless network 102 and the communication network 103. The mobile device 101 deploys the information centrally on the mobile device 101. The information may be in the form of a mobile application, wherein the mobile application may be capable of working in offline mode and runs natively on the mobile device 101. Further, the mobile applications work on a metadata driven architecture using a message structure. The details and related information of the application can be stored and retrieved from an application database and transmitted to the mobile device 101. The mobile device 101 interprets and parses the application data and renders at the run time. The application data which is interpreted and parsed may include the user interface elements and data elements of the application. The mobile device 101 checks with the application management server 104 for any updates of the application, wherein the updates may comprise of changes in at least one of the user interface or the data. On detecting a change in the application, the mobile device 101 fetches the updated application elements and stores the updated elements in a suitable location. In an example, on detecting a change in the user interface on the application management server, the mobile device 101 fetches the updated user interface elements and stores the updated user interface elements in a suitable location. The application also includes inbuilt message queues which handle offline data storage and synchronization with the mobile server when connectivity is available.

Figure 2:
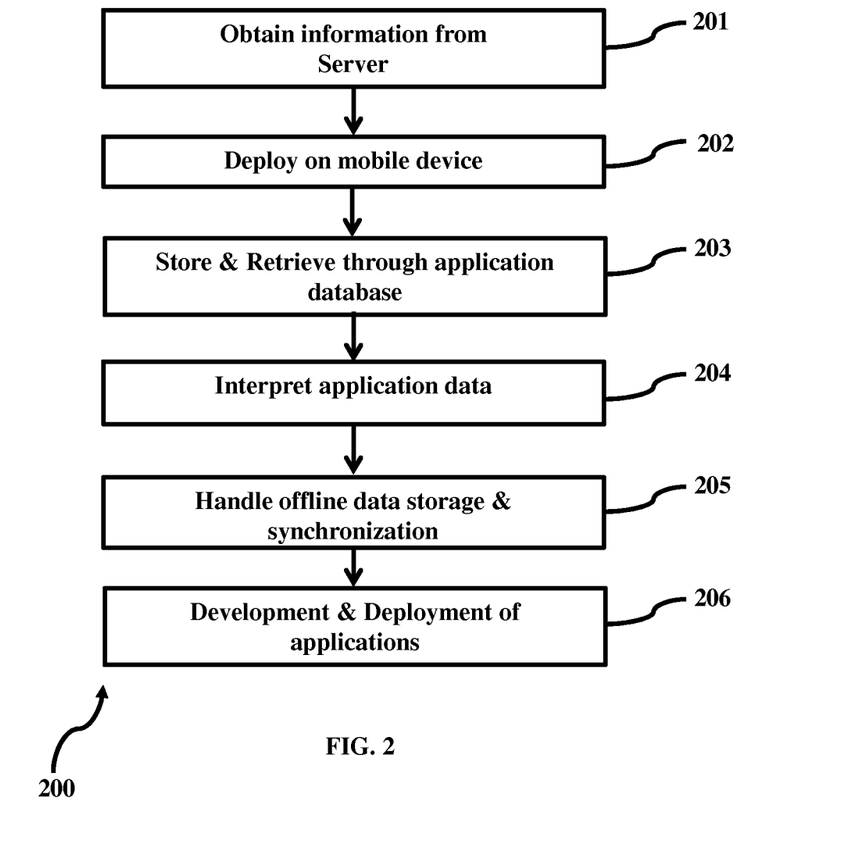
FIG. 2 is a flow diagram which depicts the various steps involved in development and deployment of mobile applications as disclosed in the embodiments herein.
Figure 3:
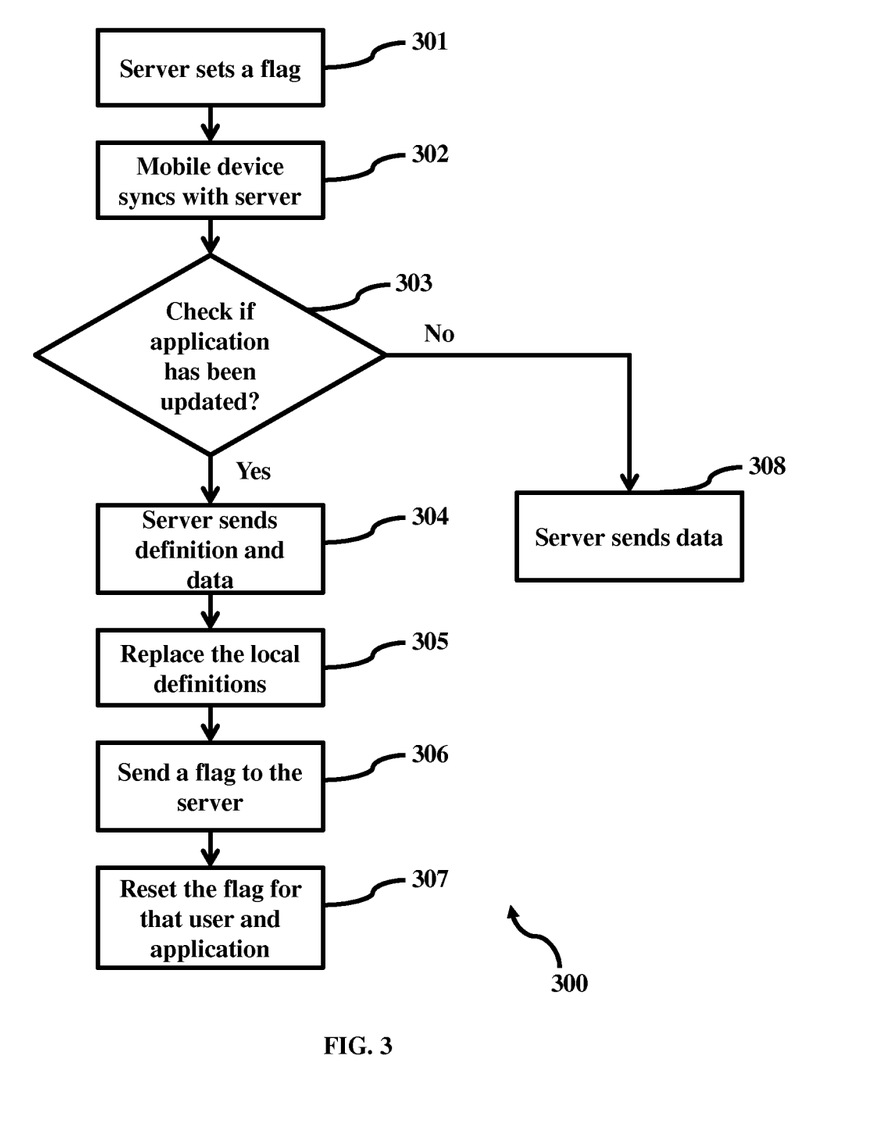
FIG. 3 is a flowchart illustrating the process of a mobile device checking for updates and performing the updates, according to embodiments as disclosed herein.

FIG. 2 is a flow diagram, which depicts the various steps involved in development and deployment of mobile applications, as disclosed in the embodiments herein. Initially, users can obtain (201) information from the application management server and deploy (202) them centrally on the mobile device 101. Mobile applications are capable of working in offline mode and run natively on the mobile device 101. Further, mobile applications work on a metadata driven architecture using a proprietary message structure. Application details can be stored and retrieved (203) from the application database and transmitted to the mobile device 101. The mobile device 101 interprets (204) and parses the application data and renders at the run time. The application data which is interpreted and parsed may include the user interface elements and data elements. The architecture allows receiving of updated user interface elements and store locally on the mobile device only if user interface has been changed on the application management server, thus allowing for an optimized data transfer. The architecture also includes inbuilt message queues (205), which handle offline data storage and synchronization with the mobile server when connectivity is available. Further, the architecture allows developing (206) and deployment of new applications or changes to existing applications without the need to re install or redeploy mobile clients. The various actions in method 200 may be performed in the order presented, in a different order or simultaneously. Further, in some embodiments, some actions listed in FIG. 2 may be omitted FIG. 3 is a flowchart illustrating the process of a mobile device checking for updates and performing the updates, according to embodiments as disclosed herein. Whenever there is an update in the application, the application management server 104 sets (301) a flag for the User/Application indicating that the application has changed. During every sync (302) with the mobile device 101, the application management server 104 checks (303) whether the application has been updated by checking the flag. The mobile device 101 may sync either at login, after a transaction is submitted, manually triggered by the user or at pre-defined intervals. If the application has been updated, then the application management server 104 sends (304) the complete definition of the UI and the data which has changed. The UI definition is included under "@DEF" section of the message. The data definition is included under "@DAT" section of the message. When the mobile device 101 receives the response, the mobile device 101 replaces (305) local definitions with the new definition sent by the application management server 104 and sends (306) a flag to the application management server indicating that the definitions have been updated. The application management server 104 then resets (307) the flag for that User/Application so that next sync does not send the definitions repeatedly. If the application has not been updated, then the application management server 104 sends (308) only "@DAT" part in the response during sync which contains only the data. In this case, the existing UI in the mobile client app is not updated and is bound with the data sent to render the complete app. The various actions in method 300 may be performed in the order presented, in a different order or simultaneously. Further, in some embodiments, some actions listed in FIG. 3 may be omitted.

An Application is made up of one or more Dashboards. Each dashboard will primarily comprise of a Declaration section (DEC section) which has two sub-sections; a definition section and a data section. The Definition section (DEF section) will contain one or more definitions of the UI layouts used across the dashboard. The Data section (DAT section) will define the data and a sub-section (LVD section) will contain the UI definition which needs to be associated with that part of the data. Table 1 below depicts the overall structure of the message structure, according to embodiments as disclosed herein.

The legends used in Table 1 and Table 2 is as follows:
LST—List component
GRP—Graph component
TAB—Table List component
DTL—Detail Component
WEB_DTL—A web Detail Component
DBL—DashboardList
TAB_S—Table List component with search
TAB_ATT—Table List component with Attachments
HIER—Hierarchy
APP_CTI—Catalogue Item List
APP_CTD—Catalogue Item Details

TABLE 1

| Overall Structure | Element | Element | Element | Element | Element |
|---|---|---|---|---|---|
| Application Lookups | APP 0...n | LKP 1...n | LKC 1 1...n | lookupCode LKD 1 2 | lookupKey lookupValue |
| Dashboard | 1...n | DBD 1 | dashboardNumber | | |
| Declaration | | | DEC 0...n | DEF 1 2 3 4 1...n | definitionId typeOfComponent callSupport newToolBarEntry 1 definition elements |
| Data | | | DAT 1...n | LVL 1 2 3 0...n | levelNumber typeOfComponent backLevel LVD 1 0...n |
| | | | 0...n | LVO 1 2 3 4 | optionCaption iconName (The icon to be displayed for the option) associatedDashBoard Number appCode (The application to be displayed when the menu is invoked) |

Table 2 depicts the message structure, according to embodiments as disclosed herein. Each dashboard will primarily comprise of two sections; a declaration section and a data section. The Declaration section (DEC section) will contain definitions of the UI layouts used across the dashboard. The Data section (DAT section) will define the data.

TABLE 2

| | | | | | | Description of entries |
|---|---|---|---|---|---|---|
| Application | | | | | | The top most level, defining application |
| | APP | | | | | |
| | 0 . . . n | LKP | | | | The lookup set for this application |
| | 1 . . . n | DBD | | | | The dashboards for this application |
| Lookup | | | | | | |
| | LKP | | | | | |
| | 1 . . . n | LKC | | | | |
| | | 1 | | lookUpCode | | A unique identifier for the loopup set |
| | | 1 . . . n | LKD | | | |
| | | | 1 | lookUpKey | | The key used for backend processing |
| | | | 2 | lookUpValue | | The value that will used for UI |
| Dashboard | | | | | | |
| | DBD | | | | | |
| | 1 | dashBoard Number | | | | The unique identifier of the dashboard. This may be an integer. |
| | | DEC | | | | The declaration section that will contain various UI definition for the dashboard |
| | | 0 . . . n | DEF | | | UI definitions for the dashboard |
| | | DAT | | | | The data section that will contain drilldown data for thus dashboard in form of levels |
| | | 1 . . . n | LVL | | | various drilldown levels within this dashboard |
| Definition | | | | | | |
| | DEF | | | | | |
| | 1 | definition Id | | | | Unique identifier for the definition. |
| | 2 | typeOfComponent | | | | |
| | 1 . . . n | <details/table list> | | | | Definitions of the components e.g. Detail list component or Table List component. |
| Level | | | | | | |
| | LVL | | | | | A level within the dashboard. A dashboard can have any number of levels. |
| | 1 | levelNumber | | | | 1 for the first page |
| | 2 | typeOfComponent | | | | The component of this level |
| | 3 | backLevel | | | | Level number to map the back command to. If 0 is specified then the back command will be mapped to the previous |

TABLE 2-continued

| | | | Description of entries |
|---|---|---|---|
| | 4 | isWebView | level(should be lesser than the current level number. Indicates if the component should be displayed in a web view. |
| | 5 | displayLogo | Indicates if logo should be displayed in the bottom of the screen |
| 0...n | LVD | | List of component data within this level. This parameter will not be present if the level contains no data. |
| 0...n | LVO | | List of the option within this level |
| | 1 | optionCaption | Option Name |
| | 2 | iconName | The icon to be displayed for the option |
| | 3 | associatedDash BoardNumber | Dashboard data for this option |
| | 4 | appCode | The application to be displayed when the menu is invoked |
| Component Data | LVD | | |
| | 1 | linkToDefinition Id | Identifier of the view that will be used to display this data |
| 0...n | <ABK/ ABL etc> | componentData | Elements that contain their respective component data |

Figure 4:
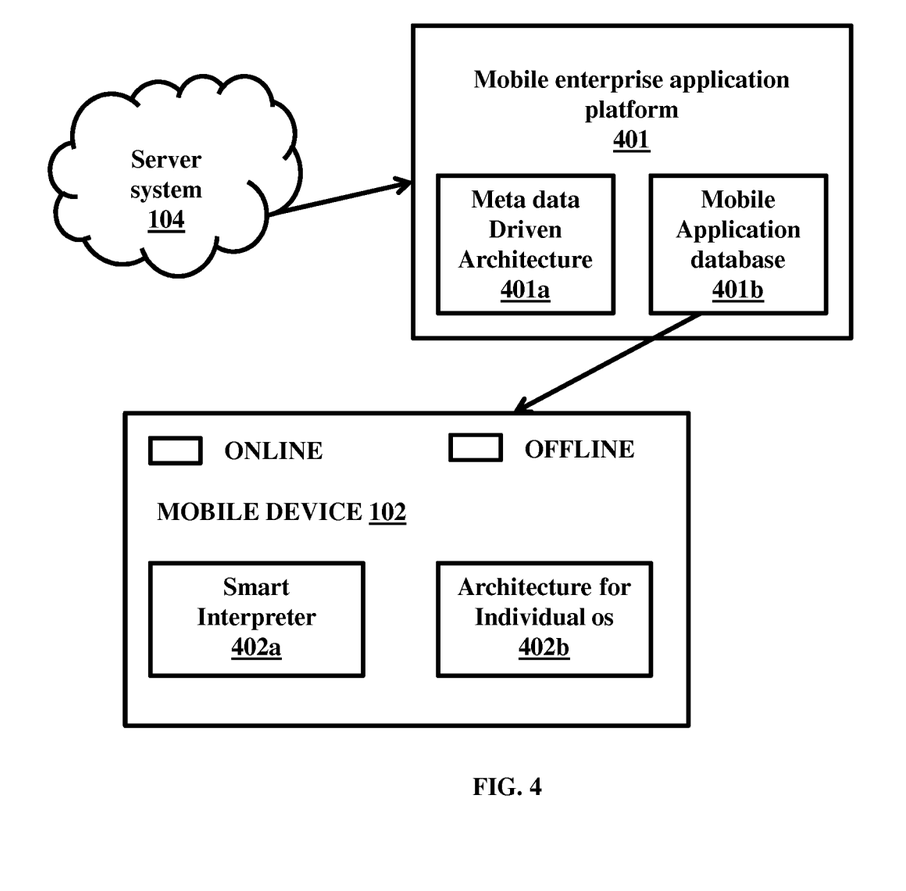
FIG. 4 is a block diagram which describes the development and deployment of mobile application according to the embodiments disclosed herein.

FIG. 4 is a block diagram which describes the development and deployment of mobile application, according to the embodiments disclosed herein. The mobile enterprise application platform 401 is designed and developed to cross mobile platform on an application management server 104 and is then deployed centrally without a further need to re install the mobile applications on the mobile device 101 each time an application is changed or new applications are added. Further, the mobile applications are capable of working in offline mode and can run natively on the device.

The mobile applications work on a Meta data driven architecture 401a using a proprietary message structure. Meta data driven architecture (MDA) 401a is a software design approach for the development of software systems. It provides a set of guidelines for the structuring of specifications, which are expressed as models. Meta data driven architecture 401a is a kind of domain engineering, and supports model-driven engineering of software systems. Further, the application details are stored in a mobile application database 401b which can be transmitted to the mobile device 101. The latest application definition and data are cached on the mobile device 101 thus allowing the applications to work even when no connectivity (OFFLINE MODE) is available.

An example of the message structure of an application is as follows:
@APP@LKP@LKC|01YN@LKD|01|02--- Select ---
@LKD|01Y|02Yes@LKD|01N|02No@LKC|01PROJ@
LKD|01|02--- Select ---
@LKD|011|02PlanningRevamp@LKD|013|02Team
Meeting@LKD|012|02Store
Review@DBD|010@DEC@DEF|01HOME|02DBL
|03N|04N@DEF|01PRO_LST__1|02TA
B|03N|04N@ABV|01000000|02FFCC00|03FF9900@
ABI|01Product|0230@ABI|01Description|0270@
DEF|01LEAVE_REQ__1|02DTL|03N|04N@
ABK|01LEAVE_REQ__1|021.01|034 0|04L|05Edit|06New
|07Save|080@ABL|01ID|02ID|03M|04N|05N|06N
|07Y@ABL|01ID|02ID|03M|04N|05N|06N|07Y@
ABL|01From|02DT|03M|04N|05Y|06Y|07Y@
ABL|01To|02DT|03M|04N|05Y|06Y|07Y@ABL|01
Reason|02TA|03L|04N|05Y|06Y|07Y|083@DEF|01TRAV
EL_REQ__1|02DTL|03N|04N@ABK|01TRAVEL_REQ__
1|021.01|0340|04L|05Edit|06New|07Save|080@
ABL|01ID|02ID|03M|04N|05N|06N|07N@
ABL|01ID|02ID|03M|04N|05N|06N|07N@ABL|01Travel
Date|02DT|03M|04N|05Y|06Y|07Y@ABL|01Travel
From|02TB|03M|04N|05Y|06Y|07Y@ABL|01Travel To|02TB|03M|04N|05Y|06Y|07Y@ABL|01Return
|02CH|03M|04N|05Y|06Y|07N@ABL|01
Return
Date|02DT|03M|04N|05Y|06Y|07N@ABL|01
Purpose|02TA|03L|04N|05Y|06Y|07Y|082@
ABL|01Project|02CB|03L|04N|05Y|06Y|07N
|08PROJ@ABL|01Comments|02TA|03L|04N|05
Y|06Y|07N|082@DAT@LVL|011|02DBL|031@
LVD|01HOME@LDL|01Home|02L@
LDG|011|022|03patientinfo.png|04|05Leave
Request|06|070|0810|09N@LDG|011|022|03
patientinfo.png|04|05Travel
Request|06|070|0820|09N@DBD|0110@DEC@DAT@
LVL|012|02DTL|030@LVD|01LEAVE_REQ_1@
ABM|01|02Enter Leave
Details|03N|04N|05Y|06C@ABN|01|02|03|04|05@
DBD|0120@DEC@DAT@LVL|012|02DTL|030@
LVD|01TRAVEL_REQ_1@ABM|01|02Enter Travel
Details|03N|04N|05Y|06C@ABN|01|02|03|04|05
|06Y|07|08|09|10.

The mobile device 101 comprises of a smart interpreter 402a which parses and interprets the application data (including User Interface elements and Data elements). The application data is also rendered at the run time. Further, the mobile device 101 comprises of architecture for individual operating system 402b with inbuilt message queues to handle offline data storage and synchronization with the application management server 104 when connectivity is available (ONLINE MODE).

The embodiments disclosed herein can be implemented through at least one software program running on at least one hardware device and performing network management functions to control the network elements. The network elements shown in FIG. 3 include blocks which can be at least one of a hardware device, or a combination of hardware device and software module.

The embodiment disclosed herein specifies a system for design and deployment of mobile enterprise application platform. The mechanism allows design and deployment of mobile enterprise application platform without the need to re install the mobile applications on the mobile devices each time an application is changed or new applications are added providing a system thereof. Therefore, it is understood that the scope of the protection is extended to such a program and in addition to a computer readable means having a message therein, such computer readable storage means contain program code means for implementation of one or more steps of the method, when the program runs on a server or mobile device or any suitable programmable device. The method is implemented in a preferred embodiment through or together with a software program written in e.g. Very high speed integrated circuit Hardware Description Language (VHDL) another programming language, or implemented by one or more VHDL or several software modules being executed on at least one hardware device. The hardware device can be any kind of device which can be programmed including e.g. any kind of computer like a server or a personal computer, or the like, or any combination thereof, e.g. one processor and two FPGAs. The device may also include means which could be e.g. hardware means like e.g. an ASIC, or a combination of hardware and software means, e.g. an ASIC and an FPGA, or at least one microprocessor and at least one memory with software modules located therein. Thus, the means are at least one hardware means and/or at least one software means. The method embodiments described herein could be implemented in pure hardware or partly in hardware and partly in software. The device may also include only software means. Alternatively, the embodiment may be implemented on different hardware devices, e.g. using a plurality of CPUs.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the claims as described herein.

What is claimed is:

1. A method for design and deployment of cross platform native mobile enterprise application platform by using a Meta data driven architecture and a defined message structure, the method comprising of:

sending complete definition of a User Interface (UI) of a mobile application in a definition section of the defined message structure and data related to the mobile application in a data section of the defined message structure separately to a mobile device by an application management server in response to a sync attempt between a mobile client application on the mobile device and the application management server, on the application management server detecting that a first flag indicating a change in the application is set, wherein the data section defines the data and a sub-section contains the UI definition associated with the data;

replacing local definitions in the mobile device with the complete definition received from the application management server by the mobile device and renders the local definitions at run time;

sending a second flag to the application management server by the mobile device after the mobile device successfully replaces the local definitions in the mobile device with the complete definition;

resetting the first flag by the application management server for the mobile application, on the application management server receiving the second flag from the mobile device to avoid sending the definition in a next sync attempt;

determining whether the UI definition is updated during the next sync attempt; and sending only data related to the mobile client application in the data section in response to determining that the UI definition is not updated.

2. The method, as claimed in claim 1, wherein the application management server sets the first flag, on detecting the change in the mobile application.

3. The method, as claimed in claim 1, wherein the method further comprises of sending data related to the mobile application to the mobile device by the application management server in response to a sync attempt between the mobile client application on the mobile device and the application management server, on the application management server detecting that the first flag indicating a change in the mobile application is not set.

4. The method, as claimed in claim 1, wherein the method further comprises of the sync attempt occurring in an online mode.

5. The method, as claimed in claim 1, wherein the method further comprises of the sync attempt occurring in an offline mode using inbuilt message queues.

6. A method for design and deployment of cross platform native mobile enterprise application platform by using a Meta data driven architecture and a defined message structure, the method comprising of:

sending complete definition of a User Interface (UI) of a mobile application in a definition section of the defined message structure and data related to the mobile application in a data section of the defined message structure separately to a mobile device by an application management server in response to a sync attempt between a mobile client application on the mobile device and the application management server, on the application management server detecting that a first flag indicating a change in the application is set, wherein the data section defines the data and a sub-section contains the UI definition associated with the data;

resetting the first flag by the application management server for the mobile application, on the application management server receiving the second flag from the mobile device to avoid sending the definition in a next sync attempt, wherein the second flag indicates that the mobile device has successfully replaced the local definitions in the mobile device with the complete definition;

determining whether the UI definition is updated during the next sync attempt; and sending only data related to the mobile client application in the date section in response to determining that the UI definition is not updated.

7. The method, as claimed in claim 6, wherein the application management server sets the first flag, on detecting the change in the mobile application.

8. The method, as claimed in claim 6, wherein the method further comprises of sending data related to the mobile application to the mobile device by the application management server in response to a sync attempt between the mobile client application on the mobile device and the application management server, on the application management server detecting that the first flag indicating a change in the mobile application is not set.

9. The method, as claimed in claim 6, wherein the method further comprises of the sync attempt occurring in an online mode.

10. The method, as claimed in claim 6, wherein the method further comprises of the sync attempt occurring in an offline mode using inbuilt message queues.

11. A method for design and deployment of cross platform native mobile enterprise application platform by using a Meta data driven architecture and a defined message structure, the method comprising of:

replacing local definitions in a mobile device with a complete definition received from an application management server by the mobile device and parsing said complete definition before rendering the local definitions at run time, wherein the complete definition comprises of a User Interface (UI) of a mobile application in a definition section of the defined message structure and data related to a mobile client application in a data section of the defined message structure separately to the mobile device in response to a sync attempt between the mobile client application on the mobile device and the application management server, on the application management server detecting that a first flag indicating a change in the application is set;

wherein said sync attempt is performed in an online mode and said mobile application is capable of working in an offline mode and runs natively on said mobile device, wherein said mobile device comprises architecture for individual operating system with inbuilt message queues to handle offline data storage and synchronization with said application management server when connectivity is available, wherein the data section defines the data and a sub-section contains the UI definition associated with the data;

sending a second flag to the application management server by the mobile device after the mobile device successfully replaces the local definitions in the mobile device with the complete definition; and receiving only data related to the mobile client application in the data section, in response to a next sync attempt in which the UI definition is not updated.

* * * * *